(12) United States Patent
Anaclerio et al.

(10) Patent No.: US 7,415,495 B1
(45) Date of Patent: Aug. 19, 2008

(54) SELECTIVE FILTER HAVING LINEAR PHASE

(75) Inventors: Cheri A. Anaclerio, Baltimore, MD (US); Christopher R. Vale, Elkridge, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 769 days.

(21) Appl. No.: 10/798,378

(22) Filed: Mar. 12, 2004

(51) Int. Cl.
*G06G 7/02* (2006.01)

(52) U.S. Cl. .................................................. 708/819
(58) Field of Classification Search ................. 708/819
See application file for complete search history.

(56) References Cited

U.S. PATENT DOCUMENTS 5,283,507 A * 2/1994 Stitt et al. ................ 318/376
5,325,188 A * 6/1994 Scarpa ..................... 348/624
6,314,444 B1 * 11/2001 Minuhin et al. ........... 708/819

* cited by examiner

*Primary Examiner*—Tan V Mai
(74) *Attorney, Agent, or Firm*—Andrews Kurth LLP

(57) ABSTRACT

A method for determining a filter that is very selective and having linear phase is described. The method starts with choosing a pole constellation in the complex frequency plane in a unique manner so that a desired passband phase of the filter is linear while preserving the desired magnitude. The method seeks to design filters that have ideal responses in both gain and phase or gain and time. This process is done methodically by finding locations of poles that yield sensible compromises between the extremes. It also makes full use of well-known traditional characteristics of the filters at the extremes.

14 Claims, 9 Drawing Sheets

SELECTIVE FILTER HAVING LINEAR PHASE

STATEMENT OF GOVERNMENT INTEREST

The U.S. Government has an interest in the subject invention pursuant to Contract No. 30009469.

FIELD OF THE INVENTION

The present invention is directed to a filter that is very selective wherein a pole constellation in the complex frequency plane is chosen in a unique manner so a desired passband phase of the filter is linear.

The filtering and selection of expected signals in early radar and communications systems was comparatively simple because signals were not sophisticated and the environment suffered from less noise and interference. Thus, very simple filtering requirements existed calling for either very good selectivity (near-rectangular steady state response) or very good pulse response, such as a Gaussian shaped time response.

The first type of filtering is "ideal" in the frequency domain and the latter is "ideal" in the time domain. As noise and interference have increased, due to cell phones as an example, and transmitted signals have become more sophisticated linear FM or "chirp" waveforms, the problem of selecting signals and rejecting interference has become much more complicated.

A common characteristic shape for steady-state filtering is a Chebychev shape. Filters based on this characteristic offer equiripple passbands and steep rejection skirts in the frequency domain. However, the consequence of near-ideal steady-state performance is very undesirable time domain characteristics. The impulse response and the step response exhibit very large ripples called "overshoots" which lead to false targets and inter-symbol interference. The extremely distorted phase response distorts complex incoming signal spectra so that autocorrelation performance can be ruined.

A Gaussian filter, on the other hand, is near ideal in the time domain but exhibits poor selectivity allowing close-in frequency signals to be transmitted through the filter.

FIG. 1 shows a $6^{th}$ order low pass filter. Element values for the sets of numbers "$g_i$," determine the filter characteristic, or shape, and are published in many books for Chebychev, Gaussian, Bessel, and other well-known functions. Each set is derived from the placement of transfer function poles in the complex frequency plane.

The complex frequency plane is shown in FIG. 2. A Chebychev constellation of complex frequency poles is shown for an $8^{th}$ order filter with a 0.01 dB passband ripple. The constellation is designated C1 to C4 and exist in complex conjugated pairs. Thus, C1 is represented by the complex number $$-0.0849+0.9808j$$

and it has a conjugate mate of $$-0.0849-0.9808j$$

on the other side of the real or σ axis. Here j represents the mathematical imaginary number $\sqrt{-1}$ This is called a normalized set of complex poles, because if the frequency response of the constellation is evaluated on the imaginary axis the resulting gain function will exhibit a voltage-out over voltage-in ratio of 0.7071 at ω=1 radian per second. This is called the passband edge and is a point where an output voltage is −3.01 dB below a maximum output in the passband.

A similar representation can be done for Bessel constellation of complex frequency poles which is shown and designated as B1 to B4. This Bessel constellation will be discussed in more detail with reference to FIGS. 4(a) and (b).

FIG. 3(a) illustrates the eighth order Chebychev magnitude response normalized to 1 rad/s cut-off. As can be appreciated in the Figure, the frequency response is approaching the rectangular or "brick wall" ideal.

In FIG. 3(b), the eighth order Chebychev phase deviation response is illustrated. It should be noted that the phase response is severely distorted far from the straight-line ideal. The straight-line ideal is commonly called "linear phase."

FIGS. 4(a) and 4(b) illustrate a magnitude and phase response for an eighth order Bessel filter. The second constellation designated B1 to B4, (illustrated in FIG. 2), is the complex frequency poles of the Bessel filter which yields maximally linear phase. Once again, if $$B1=-0.8929+1.998j$$

there exists a complex conjugate mate of the complex frequency poles at $$-0.8929-1.998j$$

The frequency response is shown in FIGS. 4(a) and (b). The stopband is far from the "brick wall" ideal wherein even with eight poles the filter only achieves 60 dB at 4.5 times the passband edge.

In comparison, the Chebychev filter gets to 60 dB at 1.8 times the passband edge; but the phase response is linear out as far as two times the passband edge. (Note the change of phase angle scale.) The Chebychev and Bessel filters represent two extremes.

Two good reference texts on this subject are "Handbook of Filter Synthesis" by A. I. Zverev, John Wiley 1967, New York, and "Frequency Analysis: Modulation and Noise" by Stanford Goldman, McGraw Hill, 1967. Both of these texts are known in the industry and are frequently consulted. The first shows design procedures and catalogs the "g" values of FIG. 1 for many standard filter characteristics. The second illustrates the desirability of linear phase using the theory of paired echoes.

While there are many types of known filters, such as Gaussian, Chebychev, Bessel and Butterworth, a need still exists for a filter that is a hybrid of the known filters. This hybrid filter needs to be very good in both the frequency domain and time domain.

Accordingly, the present invention seeks to provide a hybrid filter that can eliminate or reduce the large time domain ripples and overshoots and reduce the phase distortion produced by the Chebychev filters. Moreover, it should correct the poor stopband selectivity of the Bessel or Gaussian filters.

SUMMARY OF THE INVENTION

The present invention partakes the best features of both Chebychev and Bessel filtering in a controlled manner. It is intended to provide a method of designing customized filter based upon poles derived from known standard sets. Once the poles are determined, element values for the filter may be synthesized and designed using the latest computer programs starting from novel sets of derived poles.

Accordingly, it is an object of the invention to provide a method of designing a filter wherein the filter has nearly ideal responses in both gain and phase or gain and time.

In accordance with the invention, a method of designing a customized filter having nearly ideal responses in both gain and phase or gain and time, by utilizing poles derived from known standard sets of poles wherein the known standard sets of poles being chosen to define a frequency domain and a time domain, by proportionally migrating at least one set of complex poles from a first location to a second location, comprises the steps of:

choosing a set of complex frequency poles from said first location and said second location when a desired passband phase of the filter is linear while preserving the desired magnitude response;

normalizing said set of complex frequency poles from said first location and said second location to obtain a new proportional complex pole constellation wherein if the frequency response of the constellation is evaluated on an imaginary axis, a resulting gain function exhibits a voltage-out over voltage-in ratio of 0.7071 at $\omega=1$ radian per second;

multiplying said first and second set of complex frequency poles by predetermined weighting factors to calculate a hybrid first constellation and a hybrid second constellation; and renormalizing the hybrid first constellation and the hybrid second constellation so as to obtain a proportionally migrated complex pole constellation to said second location.

These together with other objects and advantages which will become subsequently apparent reside in the details of constructions and operation as more fully hereinafter described and claimed, reference being had to the accompanying drawings forming a part hereof, wherein like numerals refer to like parts throughout.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

FIG. 3($b$) illustrates the eighth order Chebychev phase deviation response for the conventional Chebychev filter;

FIG. 4($b$) illustrates the eighth order Bessel phase deviation response for the conventional Bessel filter;

FIG. 6($b$) illustrates a phase response for a 5:1 Chebychev:Bessel hybrid filter in accordance with the present invention;

FIG. 7($b$) illustrates an eighth order Chebychev, Bessel and 5:1 hybrid filter phase responses in accordance with the present invention;

Further scope of applicability of the present invention will become apparent from the detailed description given hereinafter. However, it should be understood that the detailed description and specific example, while indicating a preferred embodiment of the invention, are given by way of illustration only, since various changes in modifications within the spirit and scope of the invention will become apparent to those skilled in the art from this detailed description.

DESCRIPTION OF THE INVENTION

In accordance with the subject invention, a scheme of proportionally migrating poles to intermediate locations will now be described. The key is to choose the extremes of performance and multiply the end-point complex numbers by weighting factors and then renormalize the resulting complex number to obtain a new proportional complex pole constellation. The extremes of performance are chosen from the Chebychev and Bessel pole locations.

For example, if the Chebychev pole location is given as $$C_1 = -c_1' + jc_1''$$

and the Bessel pole location is given as $$B_1 = -b_1' + jb_1''$$

then a normalized new pole location between these two extremes is calculated as follows:

$$\frac{x(-c_1' + jc_1'') + y(-b_1' + jb_1'')}{x + y} \quad \text{Equation (1)}$$

where x and y are weighting numbers.

If x>y, then the new pole is closer to the Chebychev pole location; but if x<y, then the new pole is closer to the Bessel pole location.

Thus, a whole new arrangement of poles is calculated having graded characteristics between the two extremes which is controlled by the choice of x and y. Notice that the set of poles or constellation closer to the imaginary axis are chosen to be anywhere between a Butterworth set and a high-ripple Chebychev set. Likewise the left-most set of poles are synchronously tuned or a Gaussian constellation.

In accordance with the method of designing a customized filter having nearly ideal responses in both gain and phase or gain and time, by utilizing poles derived from known standard sets of poles, wherein the known standard sets of poles being chosen to define a frequency domain and a time domain by proportionally migrating at least one set of complex poles from a first location to a second location is set forth in the steps of (a) choosing a set of complex frequency poles from the first location and the second location when a desired passband phase of the filter is linear while preserving the desired magnitude response; (b) normalizing the set of complex frequency poles from the first location and the second location to obtain a new proportional complex pole constellation; (c) multiplying the first and second set of complex frequency poles by predetermined weighting factors to calculate a hybrid first constellation and a hybrid second constellation; and (d) renormalizing the hybrid first constellation and the hybrid second constellation so as to obtain a proportionally migrated complex pole constellation to the second location.

Figure 1:
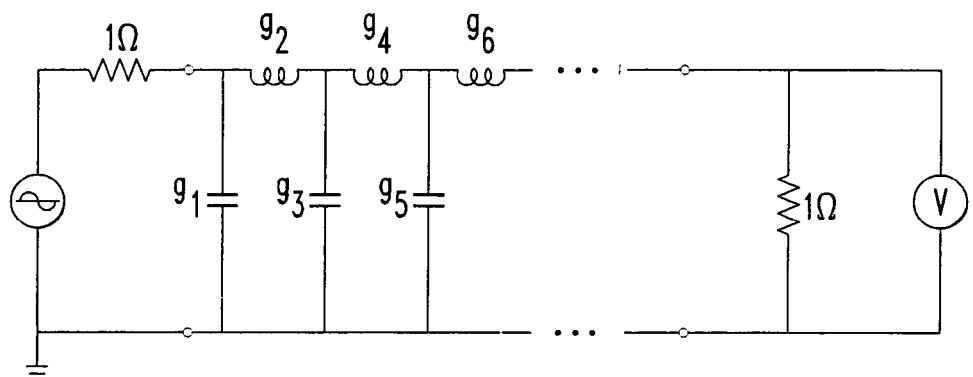
FIG. 1 illustrates a $6^{th}$ order low pass filter.
Figure 2:
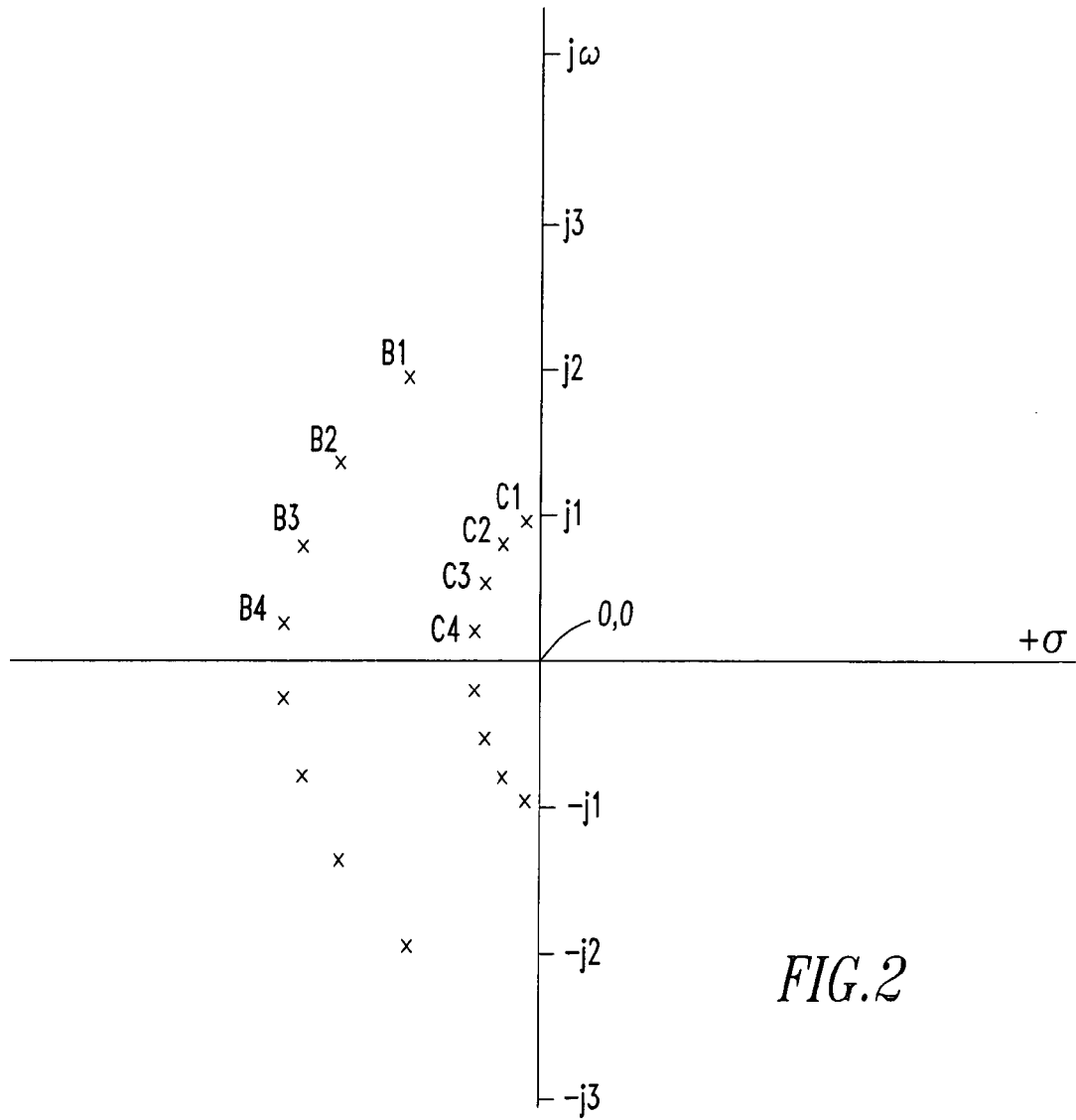
FIG. 2 illustrates a Chebychev and a Bessel constellation of complex frequency poles.
Figure 3A:
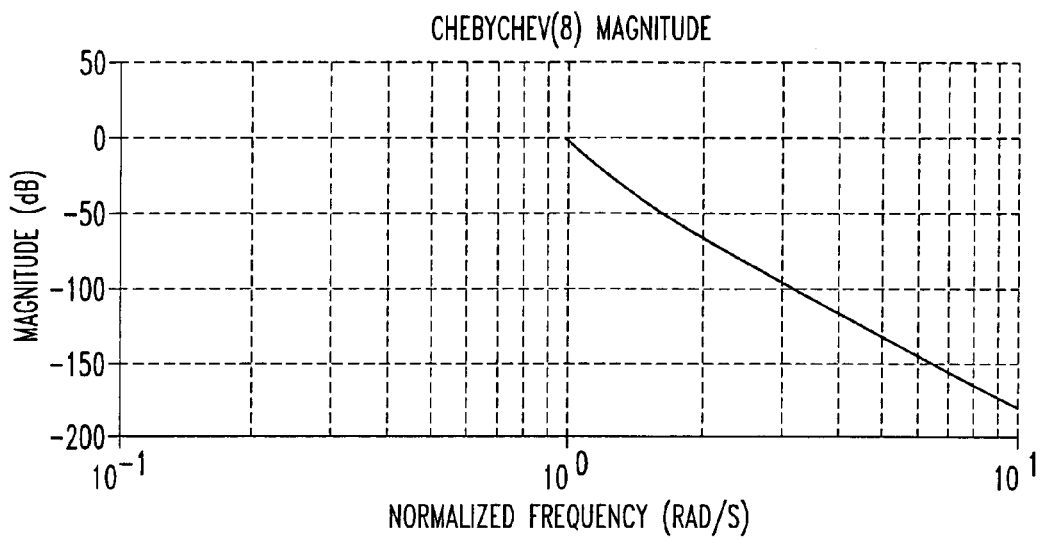
FIG. 3($a$) illustrates an eighth order Chebychev magnitude response from a conventional Chebychev filter.
Figure 3B:
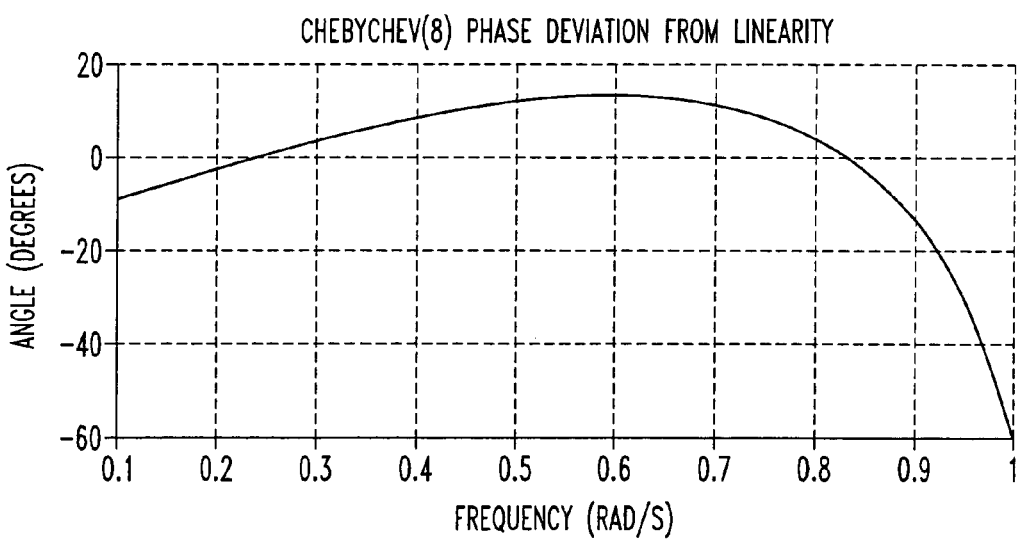
Figure 4A:
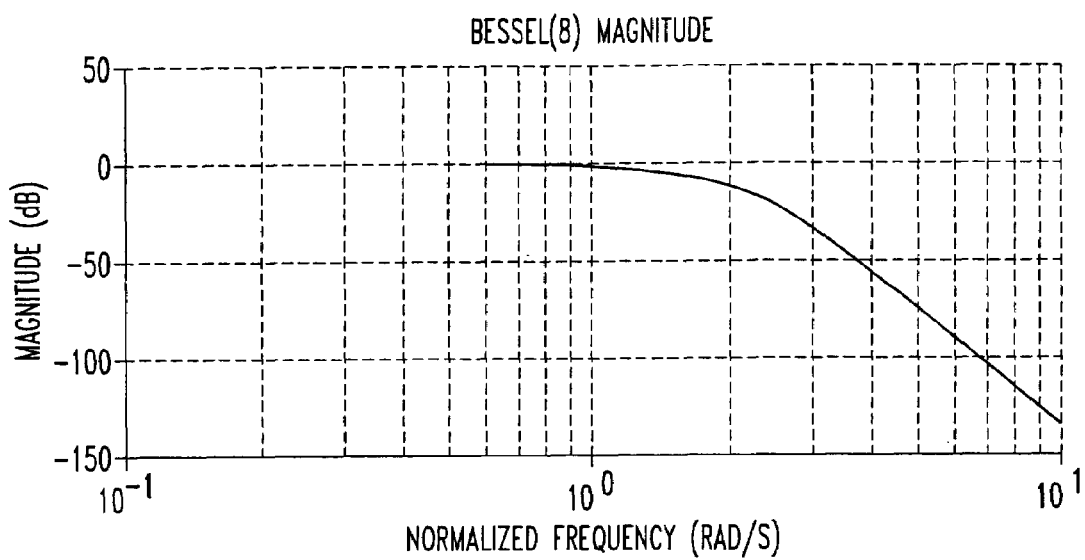
FIG. 4($a$) illustrates an eighth order Bessel magnitude response for a conventional Bessel filter.
Figure 4B:
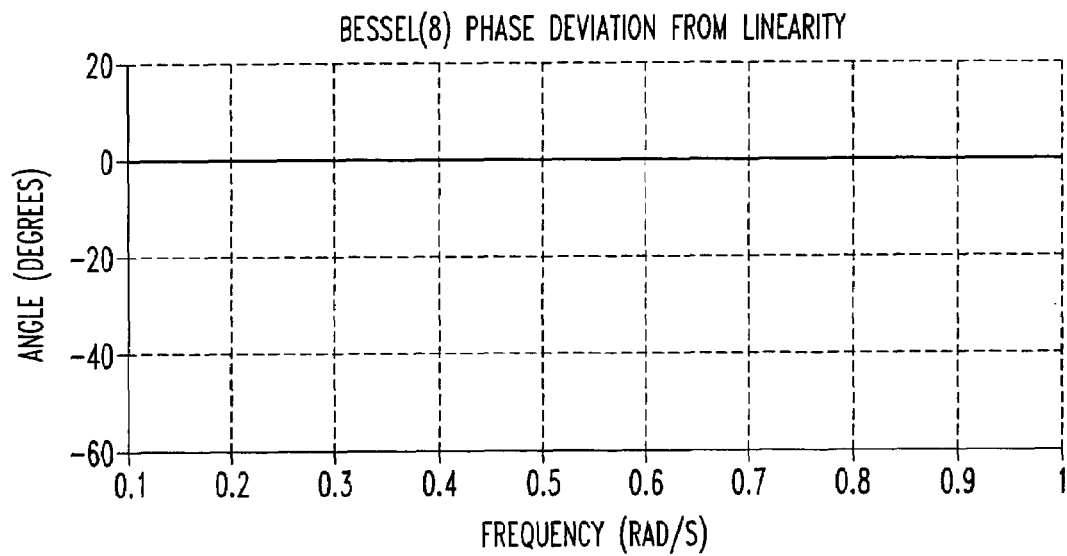
Figure 5A:
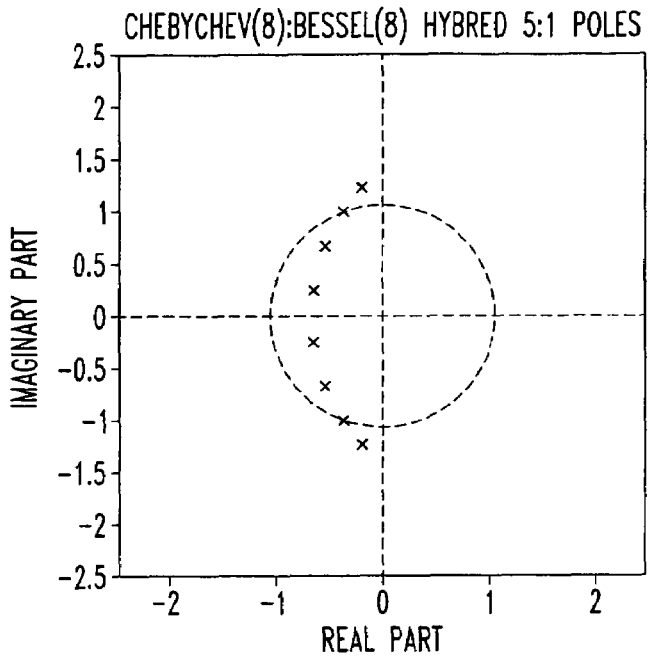
FIGS. 5($a$)-5($c$) illustrates a hybrid of constellation of complex frequency poles in accordance with the present invention.
Figure 5B:
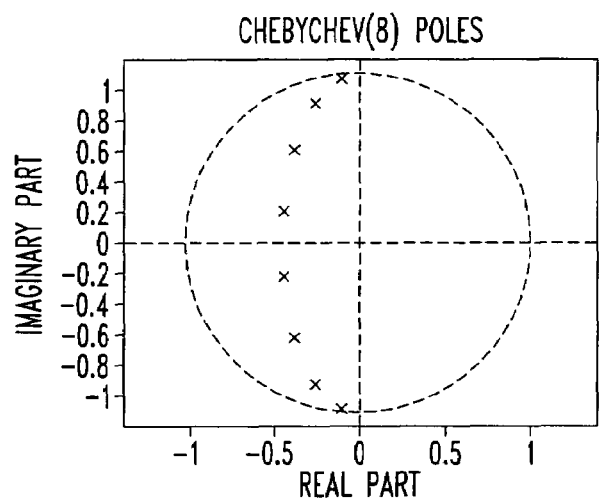
Figure 5C:
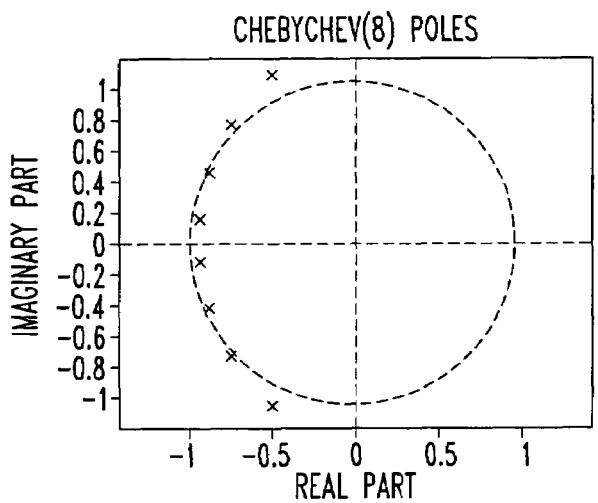

Reference now to the remaining figures to describe the invention, FIG. 5(a) shows a set of new poles derived using equation (1) that are between the Bessel set, shown in FIG. 5(c) and the Chebychev set, shown in FIG. 5(b), with x=5 and y=1. The movement of the poles allows for a response that is neither purely Bessel nor Chebychev, but is hybrid of the two.

Figure 6A:
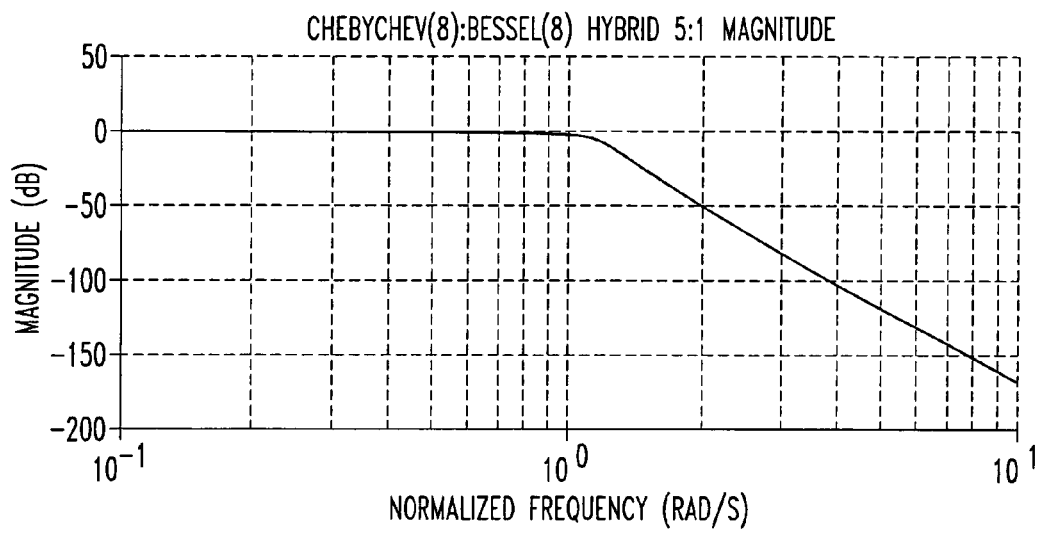
FIG. 6($a$) illustrates a magnitude response for a 5:1 Chebychev:Bessel hybrid filter in accordance with the present invention.

FIG. 6(a) illustrates the magnitude response for an eighth order 5:1 Chebychev:Bessel hybrid filter whose poles are shown in FIG. 5(a) in accordance with the present invention. Note that the magnitude response is more squared off than that of the Bessel and closely approximates the response of the Chebychev.

Figure 6B:
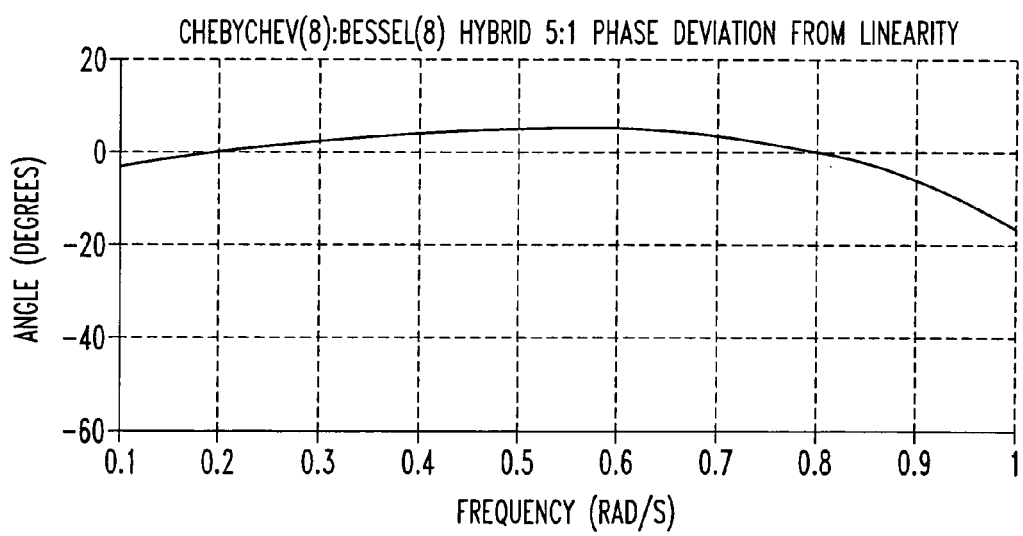

FIG. 6(b) illustrates a phase response for a 5:1 Chebychev:Bessel hybrid filter in accordance with the present invention. The phase response is more linear than that of the Chebychev filter, while still preserving the squared off characteristic of the magnitude response.

Figure 7A:
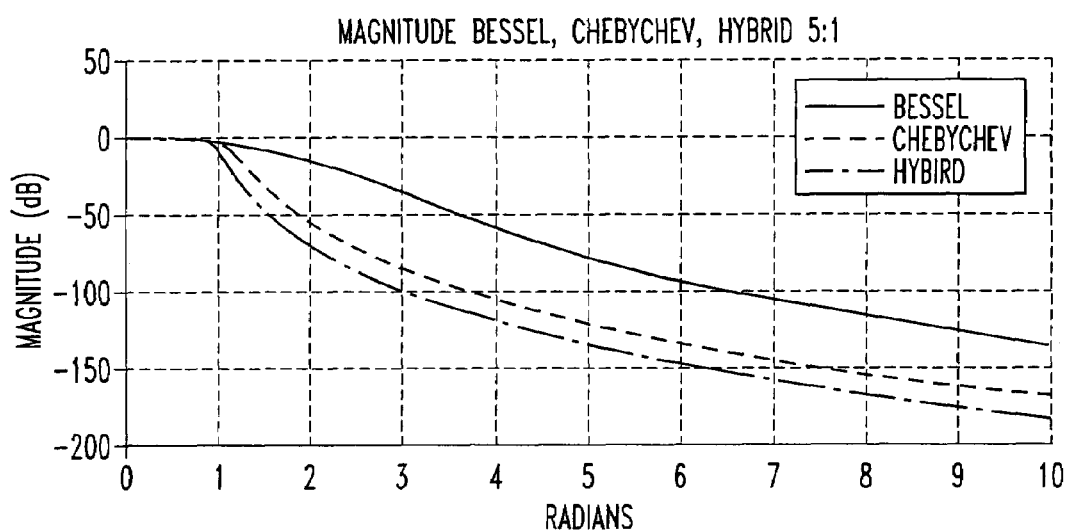
FIG. 7($a$) illustrates an eighth order Chebychev, Bessel and 5:1 hybrid filter magnitude responses in accordance with the present invention.

FIGS. 7(a) and (b) show the normalized magnitude and phase responses of all three filters superimposed for easy comparison.

More specifically, FIG. 7(a) illustrates an eighth order Chebychev, Bessel and 5:1 hybrid filter magnitude response. As illustrated, the hybrid model achieves 60 dB at about 2.2 times the passband edge. As discussed earlier, the Chebychev achieves 60 dB at 1.8 times the passband edge while the Bessel achieves 60 dB at 4.5 times the passband edges.

Figure 7B:
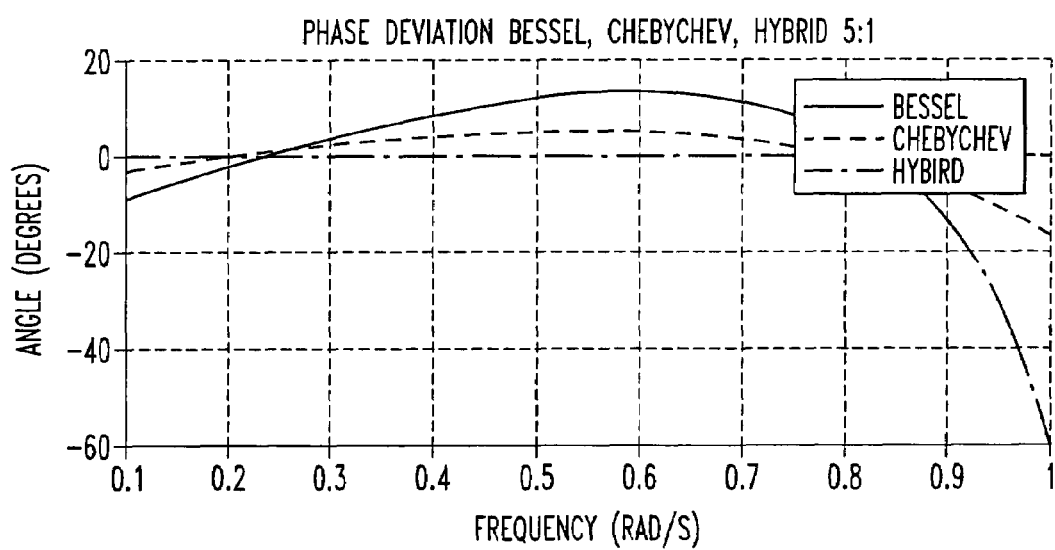

FIG. 7(b) shows an eighth order Chebychev, Bessel and 5:1 hybrid filter phase response. In addition, as illustrated in FIG. 7(b), the phase response of the hybrid filter is considerably more linear than that of the Chebychev, having a phase deviation of less than 5 degrees as compared to the roughly 10 degree phase deviation of the Chebychev.

X and y were experimentally varied until the computed stopband gain and the passband phase both met the system requirements. Once a favorable response combination of gain and phase or gain and time response is obtained the normalized pole locations are used to design a vast array of useful filters.

Additionally, simple transformations are used to frequency scale the low pass filter to any bandwidth. Other transformations can then be used to convert to bandpass filters. Alternatively, poles are simply transformed to bandpass clusters and directly synthesized using direct synthesis computer programs.

Figure 8A:
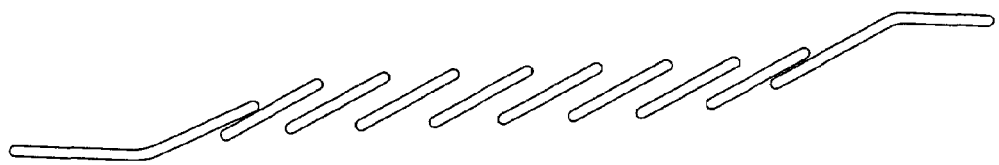
FIGS. 8($a$) and ($b$) illustrate a Chebychev:Bessel 40:1 hybrid filter designed on an LTCC substrate in accordance with the present invention, and an eleven pole hybrid microstrip filter on alumina.
Figure 8B:
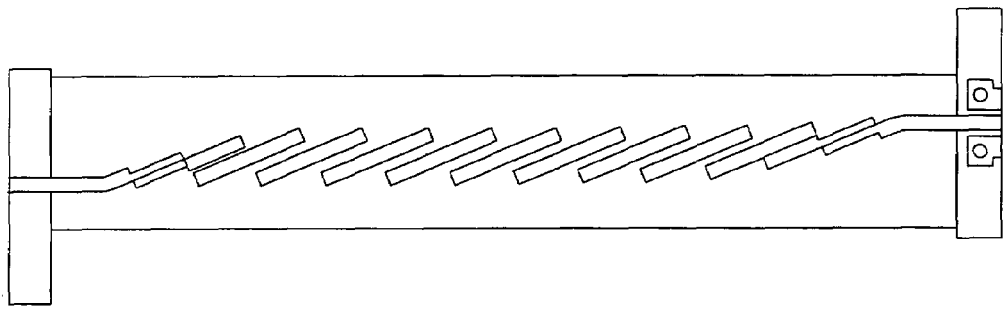

An embodiment of a filter using this technique is shown in FIGS. 8(a) and (b). More specifically, FIG. 8(a) is illustrative of the layout for a stripline Chebychev:Bessel 40:1 hybrid filter designed on a low temperature co-fired ceramic (LTCC) substrate in accordance with the present invention. FIG. 8(b) shows an eleven pole Ku-band Hybrid Chebychev-Bessel microstrip filter built on an alumina substrate.

Figure 9A:
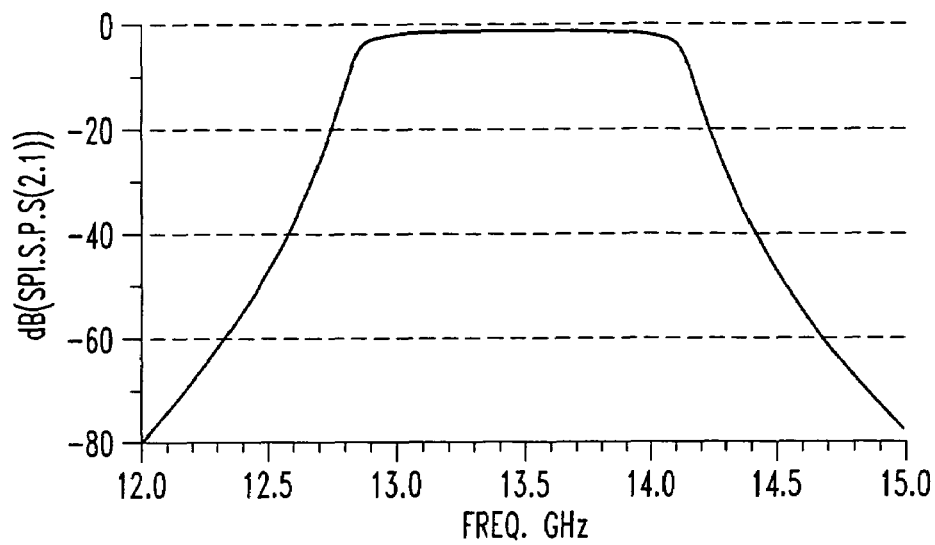
FIGS. 9($a$) and 9($b$) illustrate momentum analysis of the hybrid filter shown in FIG. 8($a$) in accordance with the present invention.
Figure 9B:
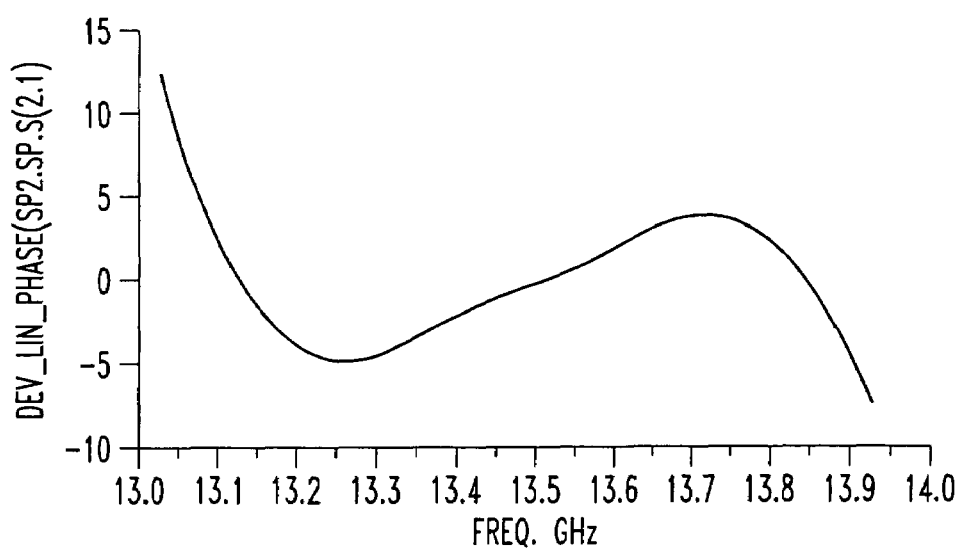

FIGS. 9(a) and 9(b) illustrate a 2.5 D electromagnetic magnitude and phase response obtained in Agilent Momentum of the hybrid filter shown in FIG. 8(a) in accordance with the present invention. The relatively sharp skirts (a) and linear phase deviation (b) are shown.

Figure 10A:
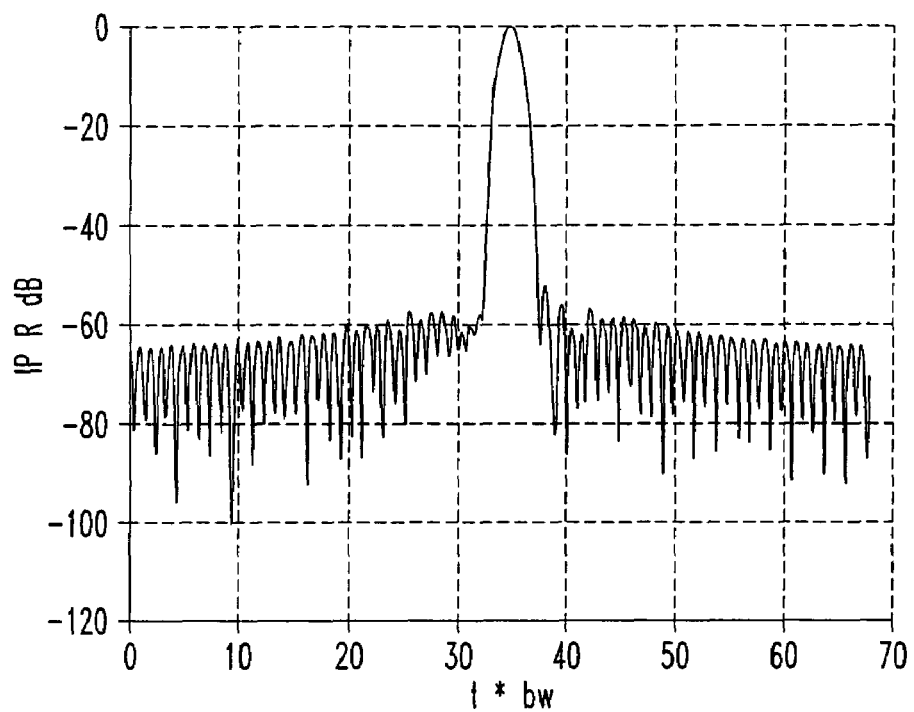
FIGS. 10($a$) and ($b$) illustrate comparison responses of a linear FM chirp after passing through a hybrid Chebychev-Bessel filter (a) and an 8-pole standard Chebychev filter (b).
Figure 10B:
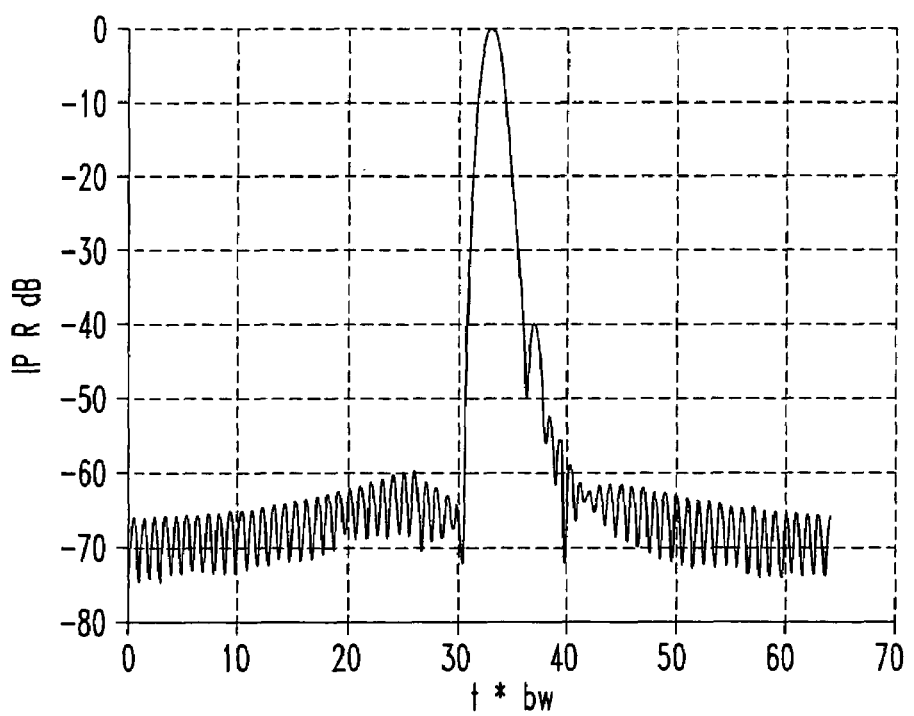

FIGS. 10(a) and (b) illustrate correlation responses of a linear FM chirp after passing through a hybrid Chebychev-Bessel filter and an 8-pole standard Chebychev filter. Both are designed for a center frequency of around 13 GHz and a passband of approximately 1 GHz. As seen in the plots, the correlation response of the hybrid filter demonstrates a much narrower main lobe and lower first sidelobe than that of the Chebychev filter.

While this procedure cannot design filters that have ideal responses in both gain and phase or gain and time, it does methodically find locations of poles that yield sensible compromises between these extremes. It also makes full use of well-known traditional characteristics of the filters at the extremes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented method of designing a customized filter for communication systems having nearly ideal responses in both gain and phase or gain and time, comprising the steps of:

choosing a first set of complex frequency poles from a first location and a second set of complex frequency poles from a second location when a desired passband phase of the filter is linear while preserving the desired magnitude response; and normalizing said first and second sets of complex frequency poles from said first location and said second location to obtain a new proportional complex pole constellation by:

determining weighting factors by varying the weighting factors until a computed stopband gain and a passband phase both meet system requirements of nearly ideal responses, multiplying said first and second sets of complex frequency poles by the weighting factors to calculate the new proportional complex pole constellation, wherein the new proportional complex pole constellation defines the customized filter, the customized filter having nearly ideal responses in both gain and phase or gain and time.

2. The method of claim 1, wherein said step of choosing said set of complex frequency poles from said first location and said second location, comprises choosing a pair of normalized set of poles $$C_n = -c_1' + jc_1''$$

and $$B_n = -b_1' + jb_1''$$

when $C_n$ and $B_n$ comprises a first and second normalized set of poles $c_n$ and $b_n$, and wherein the step of multiplying comprises multiplying the end-point number of poles by x and y, where x and y are weighting numbers, and where the step of normalizing comprises dividing the sum of the weighted poles by x and y according to the equation $$\frac{x(-c_1' + jc_1'') + y(b_1' + jb_1'')}{x+y}$$

so as to migrate, wherein if x>y, then the new pole being closer to the first location; and if x<y, then the new pole being closer to the second location.

3. The method of claim 2, wherein $C_n$ comprises a Chebychev constellation of complex frequency poles and $B_n$ comprises a Bessel constellation of complex frequency poles, and the first location comprises a Chebychev location and the second location comprises a Bessel location.

4. The method of claim 1, wherein an arrangement of poles being calculated having graded characteristics between two of the extremes which is controlled by a choice of x and y.

5. The method of claim 1, wherein the constellation being closer to the imaginary axis being chosen to be anywhere between a Butterworth set and a high-ripple Chebychev set; and the left-most set of poles being a synchronously tuned or a Gaussian constellation or other linear phase or low time transient constellation.

6. The method of claim 1, wherein said hybrid model achieves 60 dB at about 2.2 times the passband edge.

7. The method of claim 1, wherein the phase response of the hybrid filter being more linear than that of the Chebychev filter, and having a phase deviation less than the phase deviation of the Chebychev.

8. The method of claim 7, wherein the method includes the steps of:
obtaining a favorable response combination of gain and phase or gain and time response, and
using the normalized pole locations to design a vast array of filters.

9. The method of claim 1, further comprising the steps of:
using simple transformations to frequency scale a low pass filter to any bandwidth, and using other transformations to convert to bandpass filters.

10. The method of claim 1, further comprising the steps of:
transforming poles to bandpass clusters; and
using direct synthesis computer programs.

11. A computer-implemented method of designing an $n^{th}$ order filter for communication systems by initially selecting known values for each element of said filter, said known values being selected from a relatively high selectivity type filter value as a first extreme value and a linear phase or time domain filter value as a second extreme value, said first extreme value being defined as a first set of numbers forming a first set of poles on a complex frequency plane, and said second extreme value being defined as a second set of numbers forming a second set of poles on said complex frequency plane, and a first constellation defined by a plurality of said first set of poles and a second constellation being defined by a plurality of said second set of poles, said method comprising the steps of:
choosing at least one first set of complex frequency poles in a complex frequency plane to form a first constellation based on the extreme characteristics of the filter, and at least one second set of complex frequency poles in the complex frequency plane to form a second constellation based on the extreme characteristics of the filter so that a desired passband phase of the filter is linear while preserving the desired magnitude; and
normalizing the first and second sets of complex frequency poles to obtain a proportional complex pole constellation by:
determining weighting factors by varying the weighting factors until a computed stopband gain and a passband phase both meet system requirements of nearly ideal responses,
multiplying the first and second sets of complex frequency poles by the weighting factors to calculate the proportional complex pole constellation; and
wherein the proportional complex pole constellation defines the $n^{th}$ order filter, the $n^{th}$ order filter having nearly ideal responses in both gain and phase or gain and time.

12. The method of claim 11 wherein the relatively high selectivity filter value is selected from a Chebychev filter value.

13. The method of claim 11 wherein the linear phase or time domain filter value is selected from a Bessel filter value.

14. The method of claim 11 wherein the relatively high selectivity filter value is selected from a Chebychev filter value and wherein the linear phase or time domain filter value is selected from a Bessel filter value.

* * * * *